United States Patent
Maki et al.

(10) Patent No.: US 10,509,160 B2
(45) Date of Patent: Dec. 17, 2019

(54) SURFACE LIGHT SOURCE DEVICE AND DISPLAY DEVICE

(71) Applicant: Mitsubishi Electric Corporation, Tokyo (JP)

(72) Inventors: Yusuke Maki, Tokyo (JP); Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 15/888,706

(22) Filed: Feb. 5, 2018

(65) Prior Publication Data

US 2018/0239081 A1 Aug. 23, 2018

(30) Foreign Application Priority Data

Feb. 20, 2017 (JP) ................................ 2017-028662

(51) Int. Cl.
*G02F 1/1335* (2006.01)
*F21V 8/00* (2006.01)

(52) U.S. Cl.
CPC ......... *G02B 6/0088* (2013.01); *G02B 6/0021* (2013.01); *G02B 6/0035* (2013.01); *G02B 6/0068* (2013.01); *G02B 6/0078* (2013.01); *G02B 6/0055* (2013.01)

(58) Field of Classification Search
CPC .. G02B 6/0088; G02B 6/0021; G02B 6/0068; G02B 6/0055; G02B 6/0078
USPC ........................................................ 362/607
See application file for complete search history.

(56) References Cited

U.S. PATENT DOCUMENTS

| | | | | |
|---|---|---|---|---|
| 9,933,561 | B2* | 4/2018 | Fan ..................... | G02B 6/0026 |
| 2008/0101068 | A1* | 5/2008 | Kitamura ............. | G02B 6/0078 |
| | | | | 362/246 |
| 2008/0212315 | A1* | 9/2008 | Cornelissen ......... | G02B 6/0021 |
| | | | | 362/219 |
| 2009/0003002 | A1 | 1/2009 | Sato | |
| 2010/0061096 | A1 | 3/2010 | Sato | |
| 2010/0302477 | A1 | 12/2010 | Ohmi et al. | |
| 2011/0013376 | A1 | 1/2011 | Kim et al. | |
| 2011/0109834 | A1* | 5/2011 | Itoh ..................... | G02B 6/0021 |
| | | | | 349/61 |
| 2012/0327682 | A1* | 12/2012 | Kim .................... | G02B 6/0018 |
| | | | | 362/602 |
| 2013/0021818 | A1* | 1/2013 | Baek ................... | G02B 6/0011 |
| | | | | 362/602 |

(Continued)

FOREIGN PATENT DOCUMENTS

| | | | |
|---|---|---|---|
| JP | 2008-027886 A | 2/2008 | |
| JP | 2010-277712 A | 12/2010 | |
| JP | 2011-023331 A | 2/2011 | |

*Primary Examiner* — Andrew J Coughlin
(74) *Attorney, Agent, or Firm* — Studebaker & Brackett PC

(57) ABSTRACT

A surface light source device includes a light source substrate in which a plurality of light sources capable of being driven independently of one another are disposed, a light guide plate provided on the light source substrate to emit, from a specific emission surface, light entered from the plurality of light sources, and a partition frame having a partition wall for dividing the light guide plate into a plurality of cells. The partition wall of the partition frame partially has cutout portions. The light guide plate is connected between adjacent cells through the cutout portions of the partition wall.

16 Claims, 16 Drawing Sheets

(56) References Cited

U.S. PATENT DOCUMENTS

2013/0286685 A1* 10/2013 Yang ................... G02B 6/0011
                                                        362/612
2015/0198304 A1*  7/2015 Ohkawa ............ G02F 1/133606
                                                        362/97.1

* cited by examiner

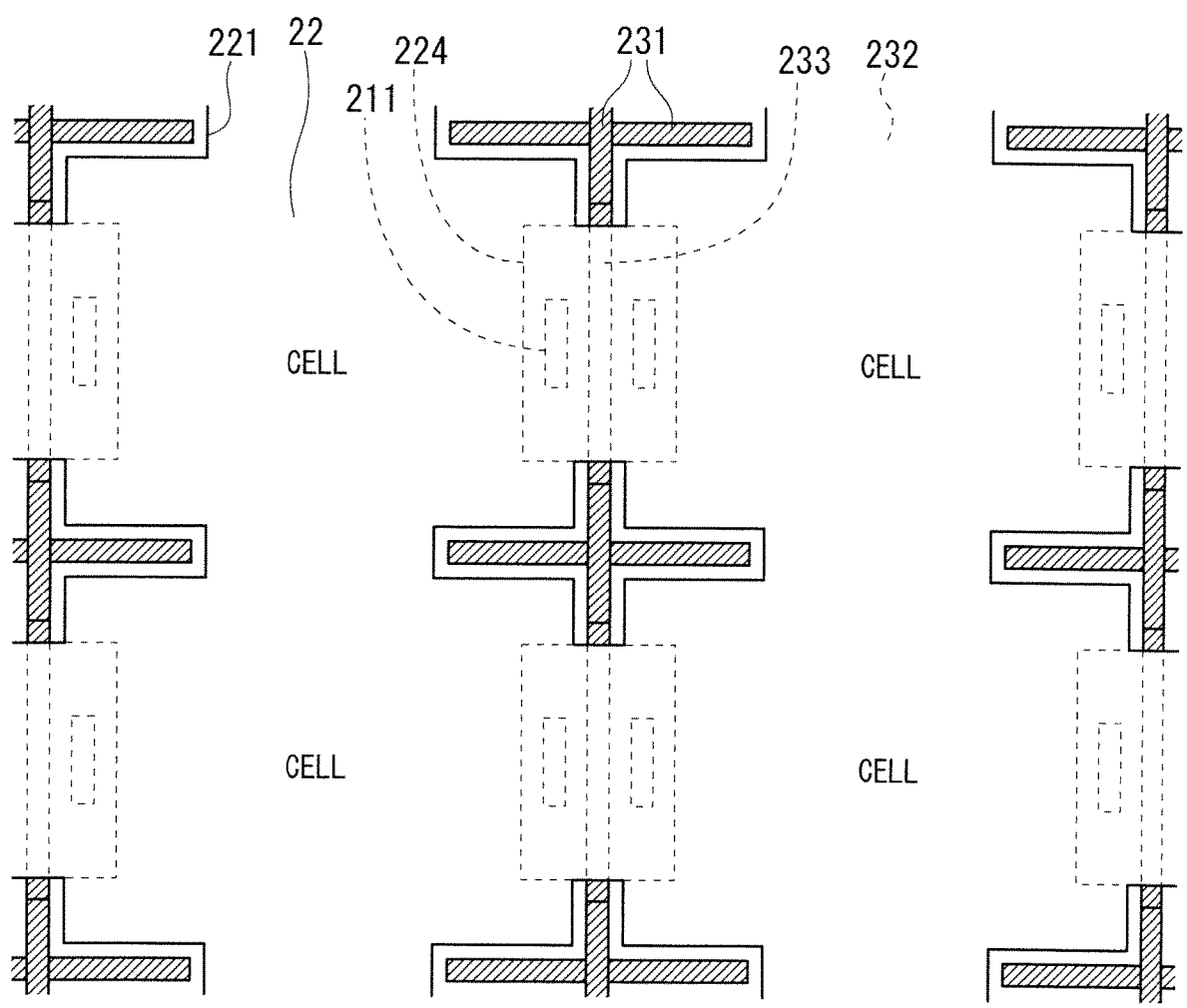
F I G . 8

F I G . 1 1
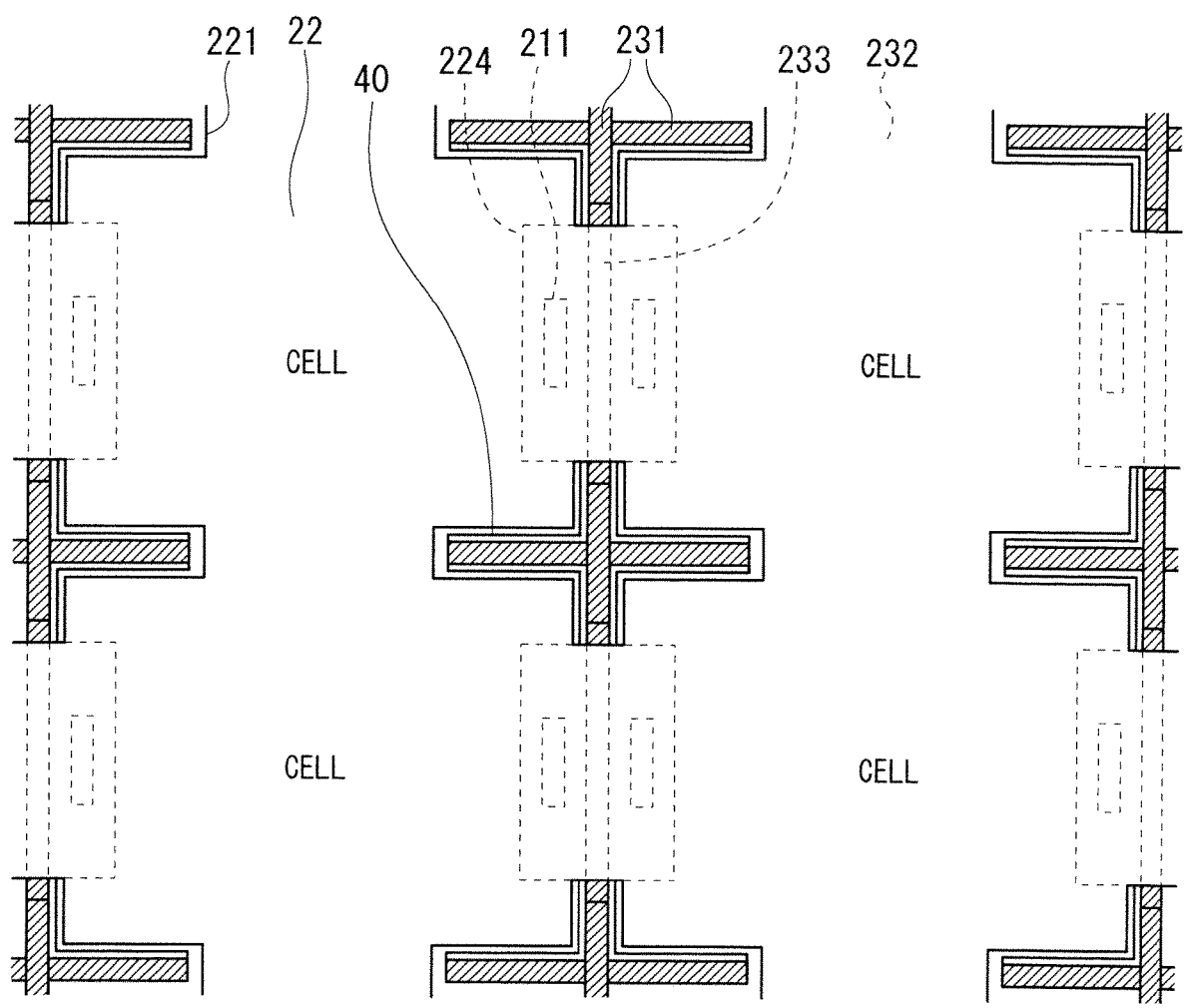

F I G . 1 2
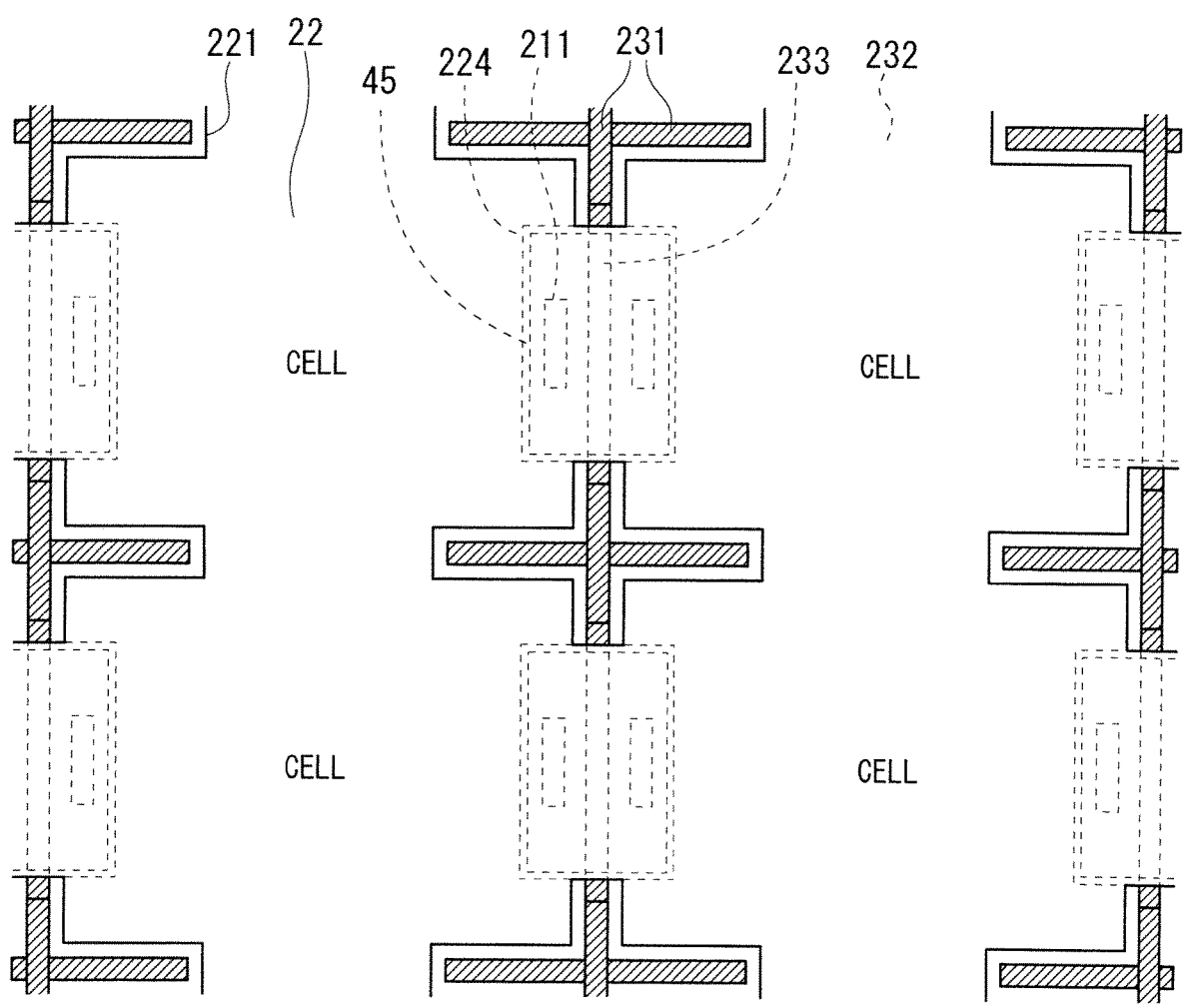

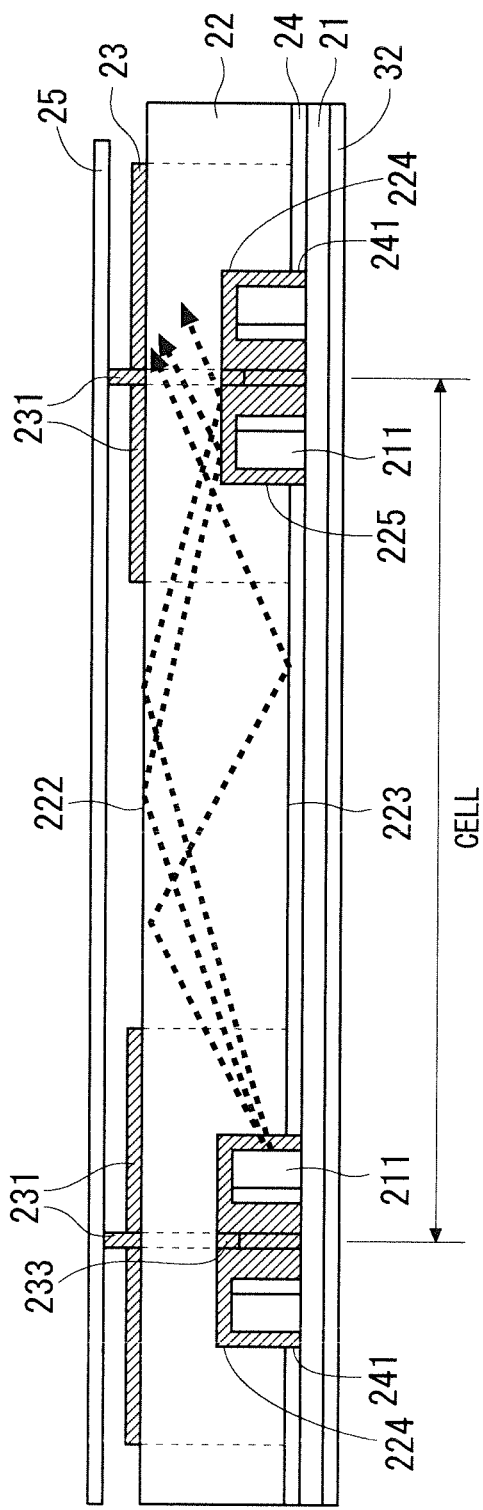

SURFACE LIGHT SOURCE DEVICE AND DISPLAY DEVICE

BACKGROUND OF THE INVENTION

Field of the Invention

The present invention relates to a surface light source device and a display device using the surface light source device.

Description of the Background Art

A display device in which a display panel itself does not emit light, such as a liquid crystal display device, generally includes a surface light source device for irradiating the display panel with light. In a related-art display device, even when a dark image is displayed, light similar to that used when a bright image is displayed is emitted from the surface light source device. In recent years, however, a technology called "local dimming" has been put into practice, where a screen of a display device is divided into a plurality of sections (cells) and brightness of the surface light source device is adjusted partly in accordance with the brightness of an image to be displayed in each cell. According to the local dimming technology, excessive light emission of the surface light source device is suppressed, and hence power consumption of a display device can be reduced.

Japanese Patent Application Laid-Open No. 2011-023331 discloses a surface light source device having a configuration in which a light guide plate is divided into a plurality of cells (light guide blocks) by grooves formed in the light guide plate, and light sources are accommodated in the grooves. Further, Japanese Patent Application Laid-Open No. 2008-27886 discloses a configuration of arranging, in each region partitioned by a lattice-shaped partition wall, a planar illumination light source device including light sources, a light guiding body, and reflecting means.

In Japanese Patent Application Laid-Open No. 2011-023331, a dot pattern or a prism pattern is formed in a surface of the light guide plate to enhance straightness of light entering each cell and prevent light emission from each cell to cells adjacent thereto, thereby suppressing generation of unevenness at a boundary portion of each cell such as a bright line and a dark line. Therefore, the light sources inevitably need to be controlled in each of the cells. Further, Japanese Patent Application Laid-Open No. 2008-27886 has an object to make emission light of a surface light source device disposed in each cell uniform, thus not being intended to prevent unevenness of luminance at a boundary portion of cells.

SUMMARY

An object of the present invention is to reduce unevenness of luminance at a boundary portion of cells while reducing power consumption in a surface light source device of a local dimming method.

A surface light source device according to the present invention includes a light source substrate, a light guide plate, and a partition frame. In the light source substrate, a plurality of light sources capable of being driven independently of one another are disposed. The light guide plate is provided on the light source substrate and emits, from a specific emission surface, light entered from the plurality of light sources. The partition frame has a partition wall to divide the light guide plate into a plurality of cells. The partition wall of the partition frame partially has a cutout portion. The light guide plate is connected between adjacent cells through the cutout portion of the partition wall.

The light guide plate is divided into a plurality of cells by the partition wall, thereby being capable of adjusting luminance of the light emitted from the light guide plate locally (in each cell). Further, the cutout portion is provided in the partition wall, thereby suppressing reduction of luminance at a boundary portion of the cells to suppress unevenness of luminance at a boundary portion of the cells. Further, a part of the light emitted from the light source of each cell enters an adjacent cell through the cutout portion, and hence in a case where a cell required to emit light with high luminance and a cell required to emit light with low luminance are adjacent to each other, for example, the light source for the cell of low luminance need not be turned on. Therefore, the number of the light sources to be turned on can be reduced, thereby being capable of suppressing power consumption.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a plan view of a principal part of the surface light source device according to the first preferred embodiment.

FIG. 11 is a view illustrating a modification example of a configuration of the partition frame.

FIG. 12 is a view illustrating a modification example of a configuration of the light guide plate.

FIG. 13 is a view illustrating a modification example of a configuration of the light guide plate.

DESCRIPTION OF THE PREFERRED EMBODIMENTS

<First Preferred Embodiment>

Figure 1:
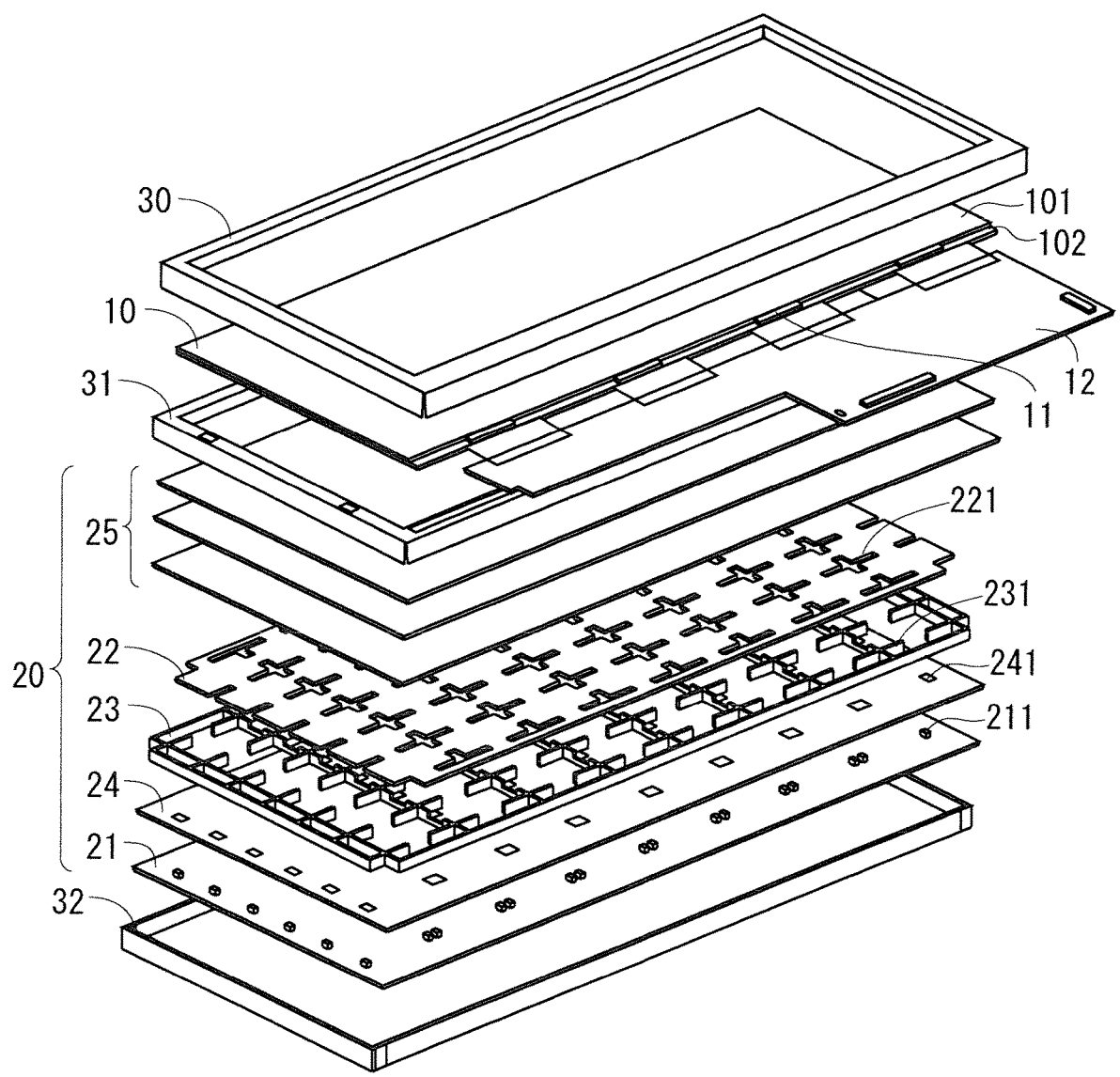
FIG. 1 is an exploded perspective view of a display device including a surface light source device according to a first preferred embodiment.

FIG. 1 is an exploded perspective view of a display device according to a first preferred embodiment of the present invention. As illustrated in FIG. 1, the display device has a configuration in which a display panel 10 and a surface light source device 20 are accommodated in a housing formed of a front frame 30, an intermediate frame 31, and a rear frame 32. In the following description, the front frame 30 side is referred to as a "front surface side," and the rear frame 32 side as a "rear surface side" as viewed from each component of the display device.

In this preferred embodiment, the display panel 10 is a liquid crystal display panel. That is, the display panel 10 includes a first substrate 101, a second substrate 102, and liquid crystals sandwiched between the first substrate 101 and the second substrate 102. Although not shown, the first substrate 101 has a configuration in which color filters, a black matrix as a light shielding layer, a counter electrode, and the like are provided on an insulating substrate such as glass. Further, the second substrate 102 has a configuration in which a pixel electrode, a thin film transistor (TFT) for supplying an image signal to the pixel electrode, and the like are provided on an insulating substrate such as glass. Between the first substrate 101 and the second substrate 102, there are provided spacers for retaining a gap between the first substrate 101 and the second substrate 102, a sealing member for attaching the first substrate 101 and the second substrate 102 to each other and sealing the liquid crystals, an alignment film for aligning the liquid crystals, and the like. Further, a polarizing plate is provided on an outer surface of the display panel 10.

A driving IC 11 is mounted on an outer peripheral portion of the second substrate 102 of the display panel 10. Further, a circuit board 12 for controlling the driving IC 11 is connected to the display panel 10. The driving IC 11 may be arranged on a tape-like wiring circuit board (such as tape carrier package (TCP) and chip on film (COF)) that is connected to an outer peripheral portion of the second substrate 102. Further, a touch panel for detecting a touch operation of a user and a transparent protective member for protecting the touch panel may be mounted on a front surface side of the display panel 10. Further, a cover for protecting the circuit board 12 may be provided on a rear surface side of the rear frame 32.

The surface light source device 20 is arranged on a rear surface side of the display panel 10, and irradiates the display panel 10 with light. As illustrated in FIG. 1, the surface light source device 20 according to the first preferred embodiment is formed of a light source substrate 21, a light guide plate 22, a partition frame 23, a reflective sheet 24, and optical sheets 25.

Figure 2:
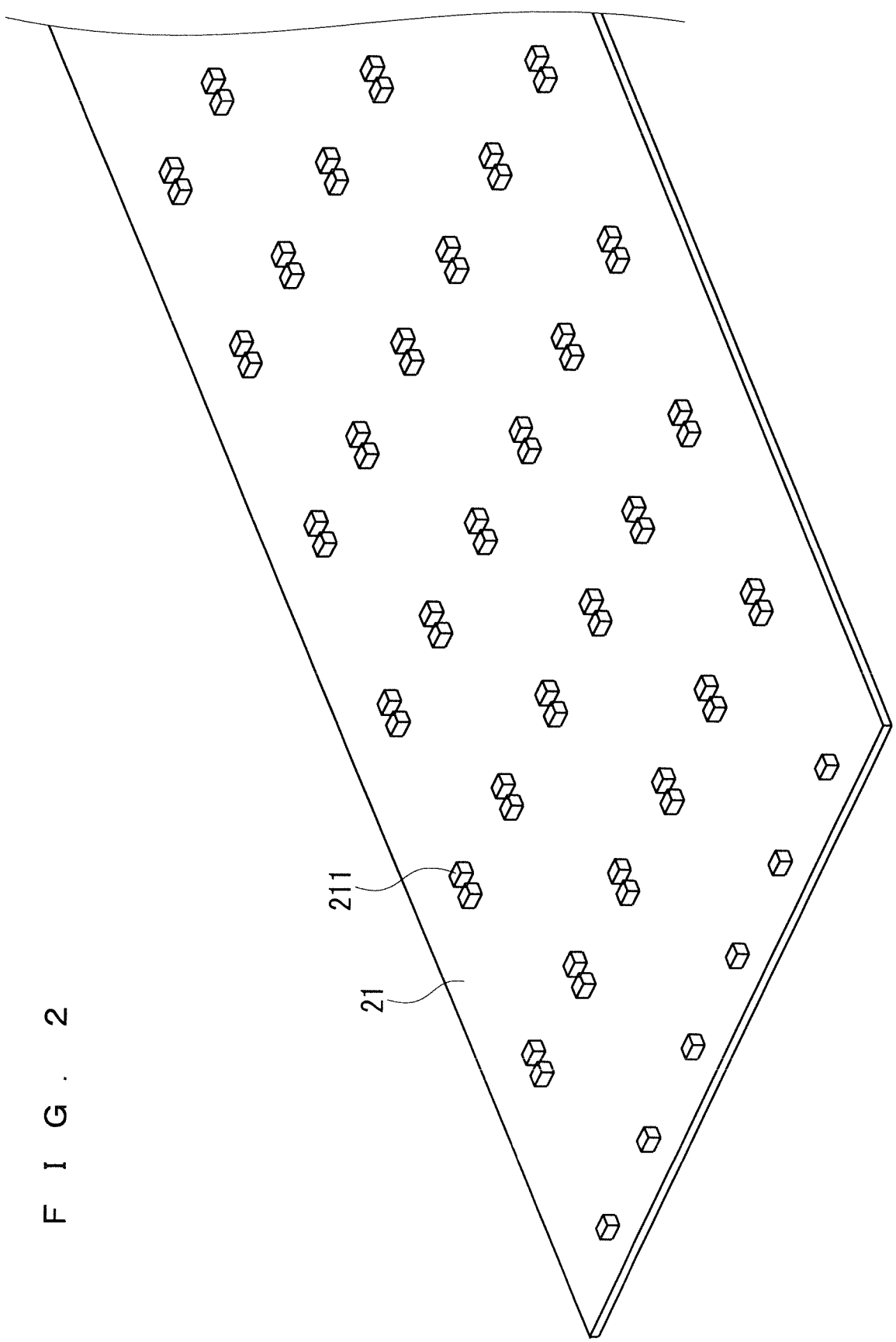
FIG. 2 is a perspective view of a light source substrate.

FIG. 2 is a perspective view of the light source substrate 21. As illustrated in FIG. 2, a plurality of light sources 211 for emitting light are mounted on the light source substrate 21. The light source substrate 21 has a configuration capable of driving of the local dimming method. That is, in the light source substrate 21, wiring is provided so that the plurality of light sources 211 may be driven by one light source as a unit or several light sources as a unit independently.

Figure 3:
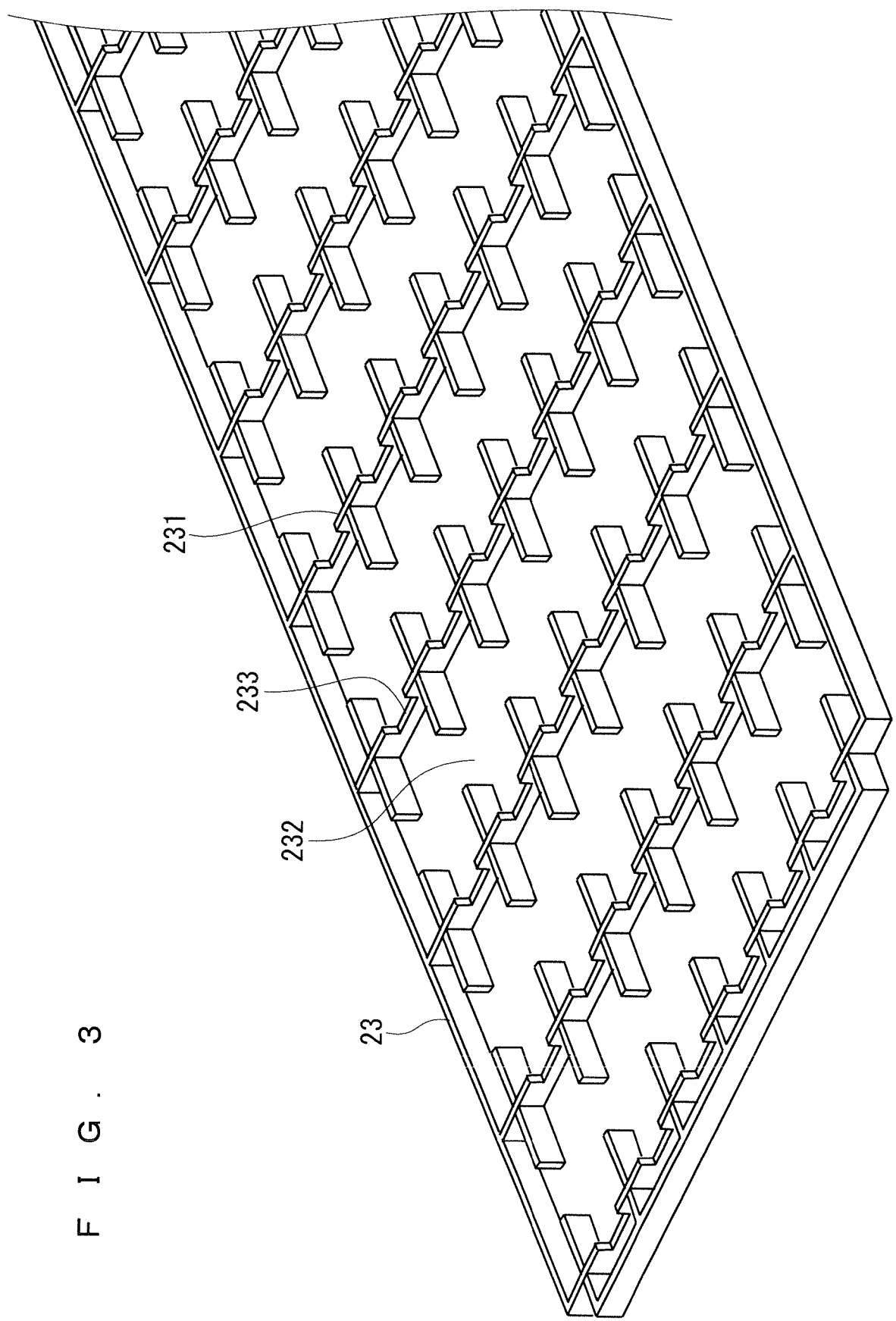
FIG. 3 is a perspective view of a partition frame.

As in FIG. 1, the light guide plate 22, the partition frame 23, and the reflective sheet 24 are disposed on a front surface side of the light source substrate 21. FIG. 3 is a perspective view of the partition frame 23, and FIG. 4 is a perspective view illustrating a state in which the light guide plate 22, the partition frame 23, and the reflective sheet 24 are arranged on the light source substrate 21 to be accommodated in the rear frame 32 (the light source substrate 21 and the reflective sheet 24 are located at positions invisible in FIG. 4).

The partition frame 23 is formed of a white resin, metal, or the like, and includes a lattice-shaped partition wall 231 as in FIG. 3. The partition wall 231 of the partition frame 23 serves a function of partitioning the surface light source device 20 into a plurality of cells.

Figure 4:
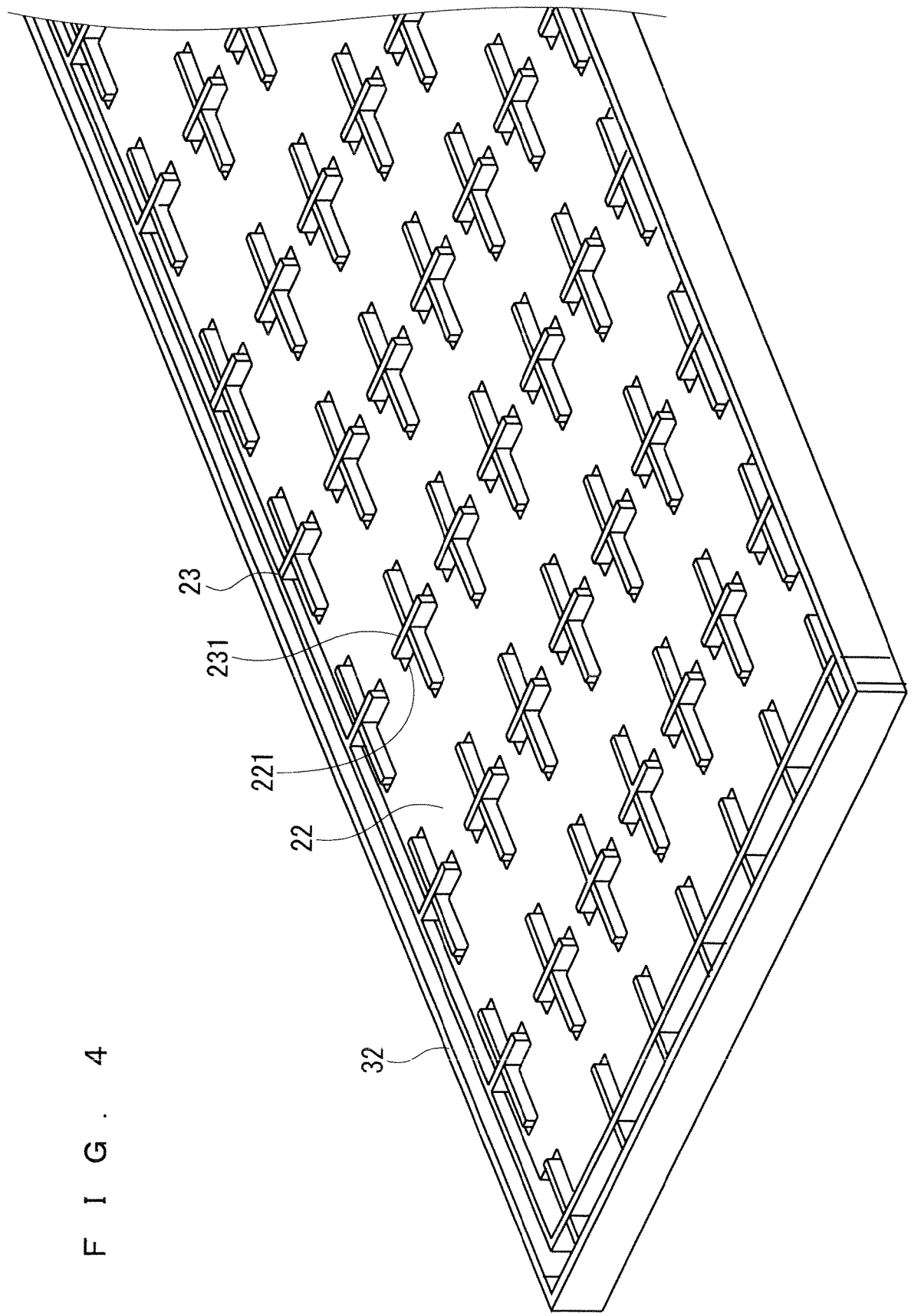
FIG. 4 is a perspective view illustrating a light guide plate and the partition frame accommodated in a rear frame.

The light guide plate 22 has holes 221 into which the partition wall 231 of the partition frame 23 is fitted as in FIG. 4. Thus, the light guide plate 22 is divided into a plurality of cells by the partition wall 231 of the partition frame 23. Note that, cutout portions 232 and 233 are formed partially in the partition wall 231, and the holes 221 of the light guide plate 22 have a shape allowing only the partition wall 231 excluding portions where the cutout portions 232 and 233 are formed to be fitted. Thus, the light guide plate 22 in each of the cells has a structure of being connected to one another through the cutout portions 232 and 233. That is, the light guide plate 22 is not separately divided completely between cells, but the light guide plate 22 is partially connected between adjacent cells. Therefore, the light guide plate 22 has an integral configuration across the plurality of cells.

The cutout portions 232 formed in the partition wall 231 of the partition frame 23 separately divide the partition wall 231 completely. On the other hand, the cutout portions 233 are formed in an upper portion of the partition wall 231, and the partition wall 231 is connected under the cutout portions 233. That is, the depth of the cutout portion 232 is smaller than the entire height of the partition wall 231. The cutout portions 233 do not separately divide the partition wall 231, thereby attaining an integral configuration of the partition frame 23.

In this manner, the integral configuration of each of the light guide plate 22 and the partition frame 23 can contribute to enhancement in easiness of assembling the surface light source device 20 and reduction in manufacturing cost.

The reflective sheet 24 is disposed between the light source substrate 21 and the light guide plate 22. In the reflective sheet 24, holes 241 are formed at positions corresponding to the light sources 211. With this, light emitted by the light source 211 enters the light guide plate 22 without being blocked by the reflective sheet 24.

As in FIG. 1, a plurality of optical sheets 25 are disposed on a front surface side of the light guide plate 22 and the partition frame 23. Those optical sheets 25 function so as to adjust intensity distribution and an emission angle of the light emitted from the light guide plate 22.

The surface light source device 20 formed of the light source substrate 21, the light guide plate 22, the partition frame 23, the reflective sheet 24, and the optical sheets 25 is accommodated in the rear frame 32. The display panel 10 is disposed on a front surface side of the surface light source device 20 accommodated in the rear frame 32 with intermediation of the intermediate frame 31. Further, the intermediate frame 31 is disposed on a front surface side of the display panel 10, and thus the display panel 10 and the surface light source device 20 are accommodated in the housing formed of the front frame 30, the intermediate frame 31, and the rear frame 32, thereby forming a liquid crystal display device. Note that, an opening for allowing the light emitted from the surface light source device 20 to enter the display panel 10 is provided in the intermediate frame 31, and an opening for exposing a display region of the display panel 10 is provided in the front frame 30.

Figure 5:
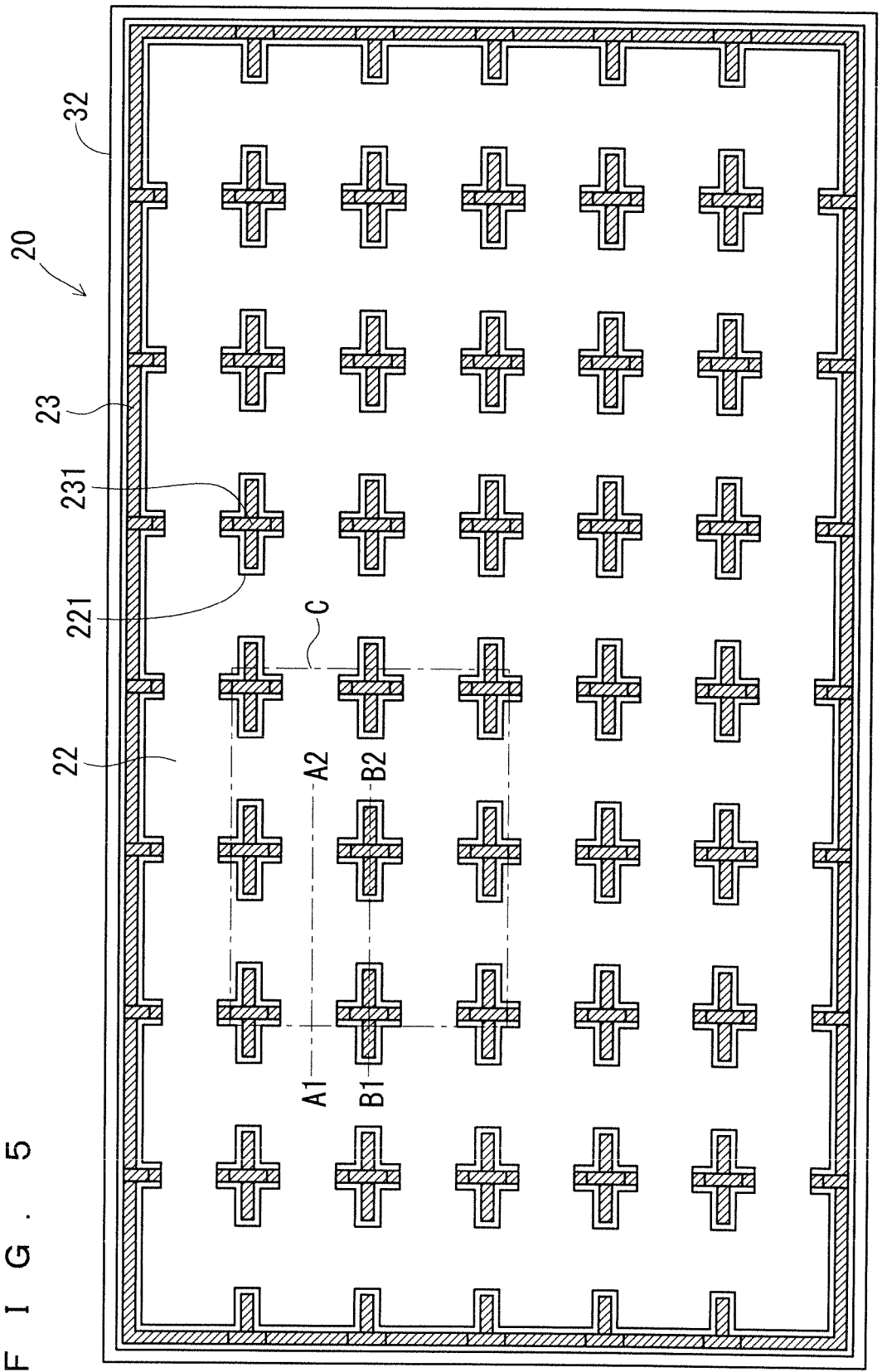
FIG. 5 is a plan view schematically illustrating a configuration of the surface light source device according to the first preferred embodiment.

Next, further detailed description is given of a configuration of the surface light source device 20 according to the first preferred embodiment. FIG. 5 is a plan view schematically illustrating a configuration of the surface light source device 20 accommodated in the rear frame 32 as viewed from a front surface side (illustration of the optical sheet 25 is omitted in FIG. 5). As described above referring to FIG. 4, the partition wall 231 of the partition frame 23 excluding the portions where the cutout portions 232 and 233 are formed is fitted into the holes 221 of the light guide plate 22. Further, the partition wall 231 of the partition frame 23 has a lattice shape in a plan view.

Figure 6:
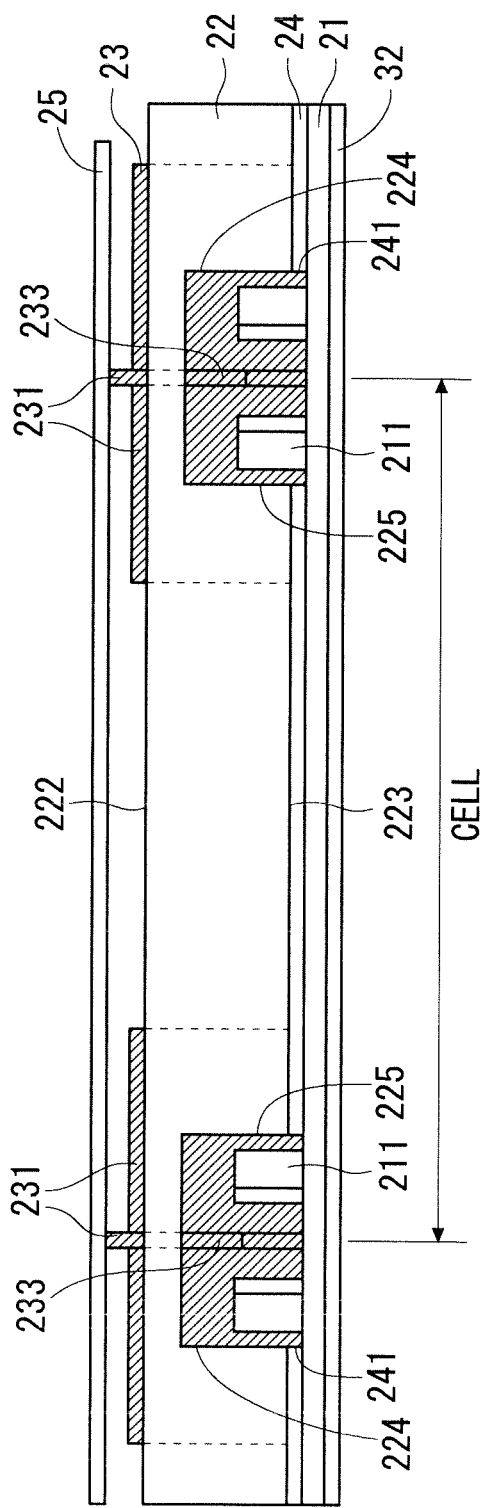
FIG. 6 is a cross-sectional view of a principal part of the surface light source device according to the first preferred embodiment.
Figure 7:
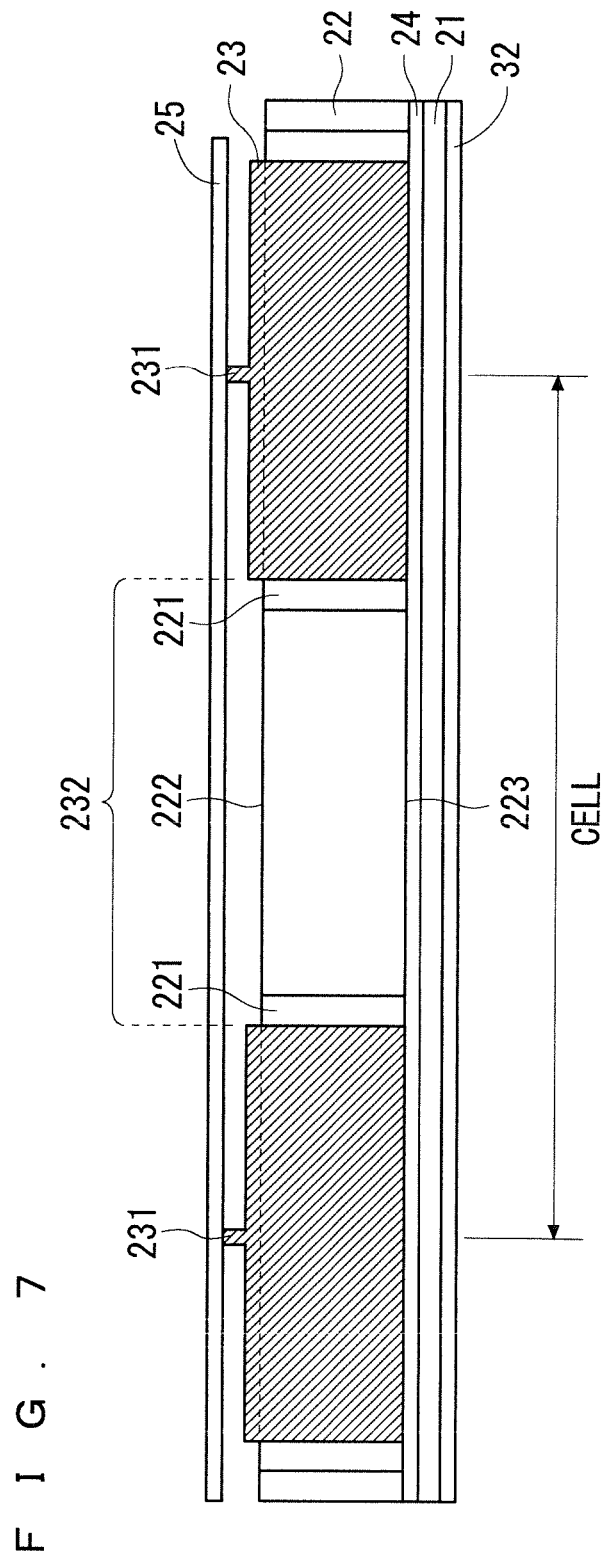
FIG. 7 is a cross-sectional view of a principal part of the surface light source device according to the first preferred embodiment.

Further, FIG. 6 and FIG. 7 are cross-sectional views of a principal part of the surface light source device 20, in which FIG. 6 corresponds to a cross section taken along the line A1-A2 of FIG. 5, and FIG. 7 corresponds to a cross section taken along the line B1-B2 of FIG. 5. Further, FIG. 8 is a plan view of a principal part of the surface light source device 20, which corresponds to a region C illustrated in FIG. 5. The region C includes four cells partitioned by the partition frame 23.

As illustrated in FIG. 6, the light guide plate 22 has a main surface 222 on a front surface side and a main surface 223 on a rear surface side. Further, in the main surface 223 on a rear surface side of the light guide plate 22, recessed portions 224 for accommodating the light sources 211 of the light source substrate 21 are formed. Further, in the recessed portions 224 of the light guide plate 22, the partition wall 231 under the cutout portions 233 is also accommodated.

Light emitted from the light source 211 enters the light guide plate 22 through a lateral side 225 of the recessed portion 224 of the light guide plate 22. The light guide plate 22 emits the light entered through the lateral side 225 of the recessed portion 224 toward the display panel 10 from the main surface 222 on the front surface side. In the following description, the lateral side 225 of the recessed portion 224 of the light guide plate 22 is referred to as an "entrance surface," the main surface 222 on the front surface side as an "emission surface," and the main surface 223 on the rear surface side as an "opposite emission surface."

The reflective sheet 24 is arranged on the opposite emission surface 223 side of the light guide plate 22, and has a function of reflecting light emitted from the opposite emission surface 223 and making the light enter the light guide plate 22 again. As described above, the reflective sheet 24 is arranged between the light source substrate 21 and the light guide plate 22, and light emitted by the light source 211 enters the light guide plate 22 without being blocked by the reflective sheet 24 because the reflective sheet 24 has the hole 241 at a position corresponding to the light source 211. Further, the orientation of each light source 211 is set so that an emission part thereof is opposed to the entrance surface 225 of the light guide plate 22.

As illustrated in FIG. 7, the partition wall 231 of the partition frame 23 excluding the portions where the cutout portions 232 and 233 are formed penetrates the holes 221 of the light guide plate 22. That is, the height of the partition wall 231 is larger than the thickness of the light guide plate 22. Thus, the optical sheet 25 is supported by an upper end portion of the partition wall 231 that projects through the holes of the light guide plate 22, a space is formed between the emission surface 222 of the light guide plate 22 and the optical sheet 25. Existence of the space facilitates diffusion of the light emitted from the emission surface 222 of the light guide plate 22 and enhances uniformity of luminance of the surface light source device 20.

Further, as is apparent also from FIG. 5, a plurality of the holes 221 of the light guide plate 22 are provided all over the light guide plate 22, and the partition wall 231 of the partition frame 23 projects through each of the holes 221. Thus, the optical sheet 25 is supported by the partition wall 231 at a plurality of positions correspondingly to the holes 221 of the light guide plate 22, and can be arranged on the light guide plate 22 without deflecting the optical sheet 25 even in a case where the optical sheet 25 is thin, for example.

Note that, in order to prevent generation of dirt due to contact of the optical sheet 25 with the partition wall 231 of the partition frame 23, the upper end portion of the partition wall 231 may be processed to have a curved surface. Alternatively, a cushioning member may be provided on the upper end portion of the partition wall 231 to come in contact with the optical sheet 25.

As illustrated in FIG. 8, the surface light source device 20 is partitioned into a plurality of cells by the partition wall 231 of the partition frame 23. The cutout portions 232 and 233 of the partition wall 231 are located at a boundary between cells, and the light guide plate 22 in each of the cells is connected to one another through the cutout portions 232 and 233. Further, the plurality of light sources 211 on the light source substrate 21 are laid out so that at least one light source 211 is arranged in each cell.

In this preferred embodiment, the partition wall 231 of the partition frame 23 has a lattice shape in a plan view, and hence the plurality of cells partitioned by the partition wall 231 are arranged in a matrix pattern and individual cells have a rectangular shape. Further, two light sources 211 are provided in each cell. Specifically, one light source 211 is arranged in the vicinity of each of two opposing sides (two sides having the cutout portions 233) of the rectangular cell. Thus, each cell has a pair of light sources 211 that oppose each other across the central portion of the cell. The plurality of light sources 211 are independently driven by a unit of a cell, that is, two light sources as a unit, thereby realizing driving of the local dimming method.

Further, the recessed portions 224 of the light guide plate 22 are provided on the two sides where the light sources 211 of each cell are arranged. Here, as illustrated in FIG. 6 and FIG. 8, the recessed portion 224 is arranged across a boundary (boundary defined by the cutout portion 233) of two adjacent cells and accommodates two light sources 211 that belong to respective two cells.

In the surface light source device 20 of this preferred embodiment, the light guide plate 22 is divided into a plurality of cells by the lattice-shaped partition wall 231, thereby being capable of adjusting brightness of the emission surface 222 of the light guide plate 22 locally (in each cell). Further, the cutout portions 232 and 233 are provided in the partition wall 231, thereby suppressing reduction of luminance at a boundary portion of cells. Thus, an effect of preventing generation of unevenness of luminance at a boundary portion of cells can be attained.

Figure 9:
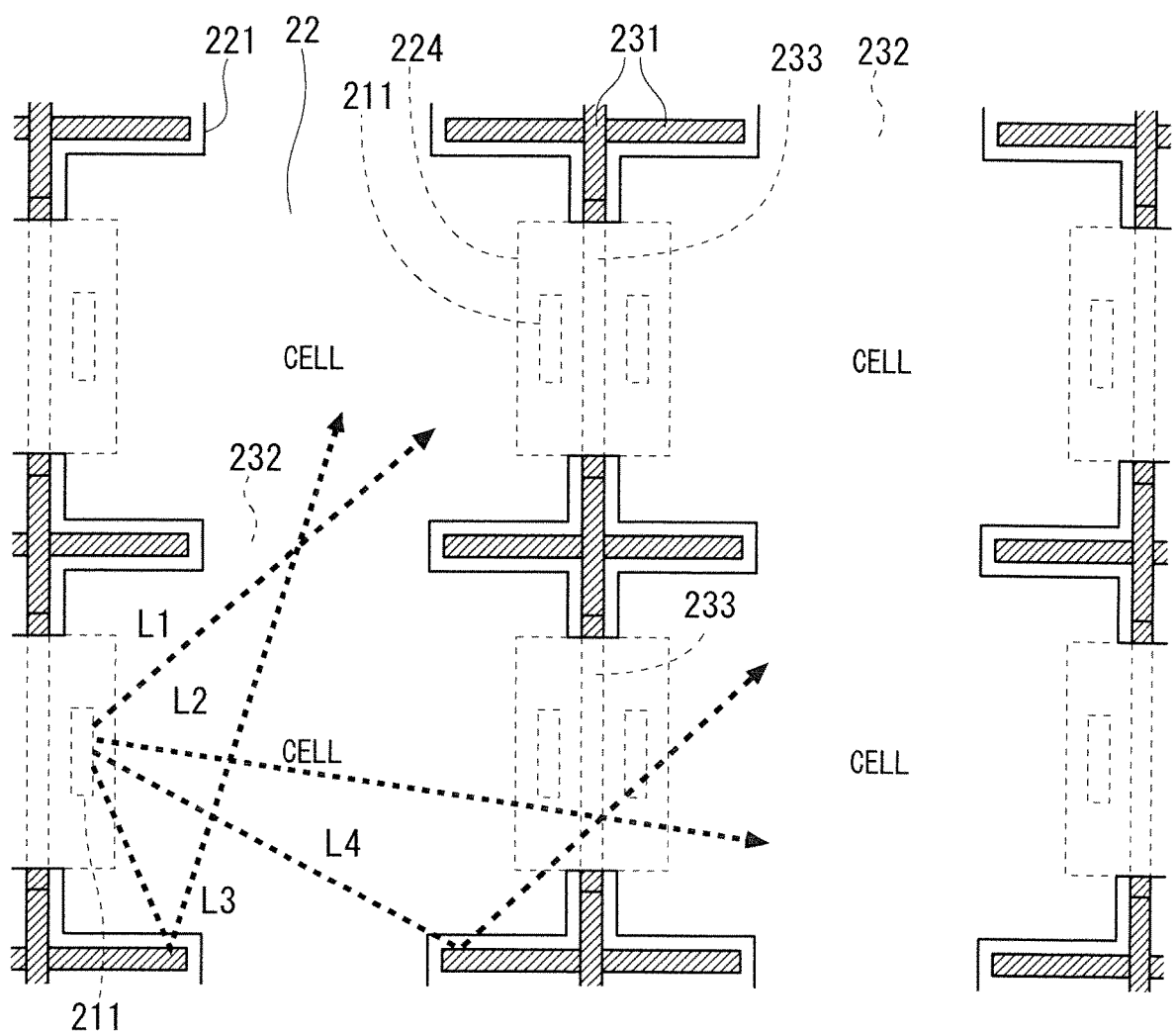
FIG. 9 is a view for illustrating effects attained by the surface light source device according to the first preferred embodiment.

Further, the cutout portions 232 and 233 are provided in the partition wall 231, and hence light is not blocked between cells. That is, light can pass through between the cells. Thus, as illustrated in FIG. 9, a part of the light emitted from the light source 211 enters, not only a cell to which the light source 211 belongs, but also cells adjacent thereto. In FIG. 9, a light beam L1 is an illustration of light that is emitted from the light source 211 to directly enter an adjacent cell through the cutout portion 232, and a light beam L2 is an illustration of light that is emitted from the light source 211 to enter an adjacent cell through the cutout portion 232 after being reflected by the partition wall 231. Further, a light beam L3 is an illustration of light that is emitted from the light source 211 to directly enter an adjacent cell through the cutout portion 233, and a light beam L4 is an illustration of light that is emitted from the light source 211 to enter an adjacent cell through the cutout portion 233 after being reflected by the partition wall 231.

In this manner, a part of the light emitted from the light source 211 of each cell enters another adjacent cell through the cutout portions 232 and 233, and hence a cell that is adjacent to a cell where light is emitted with high luminance emits light with low luminance even when the light source 211 in the cell is not turned on. For example, at the time of driving of the surface light source device 20 with the local dimming method, when a first cell required to emit light with high luminance and a second cell required to emit light with low luminance are adjacent to each other, light can be emitted in the second cell with low luminance simply by turning on the light source 211 of the first cell without turning on the light source 211 of the second cell. Utilization of the above enables reduction in number of the light sources 211 to be turned on, and thus an effect capable of suppressing power consumption can be attained.

Figure 10:
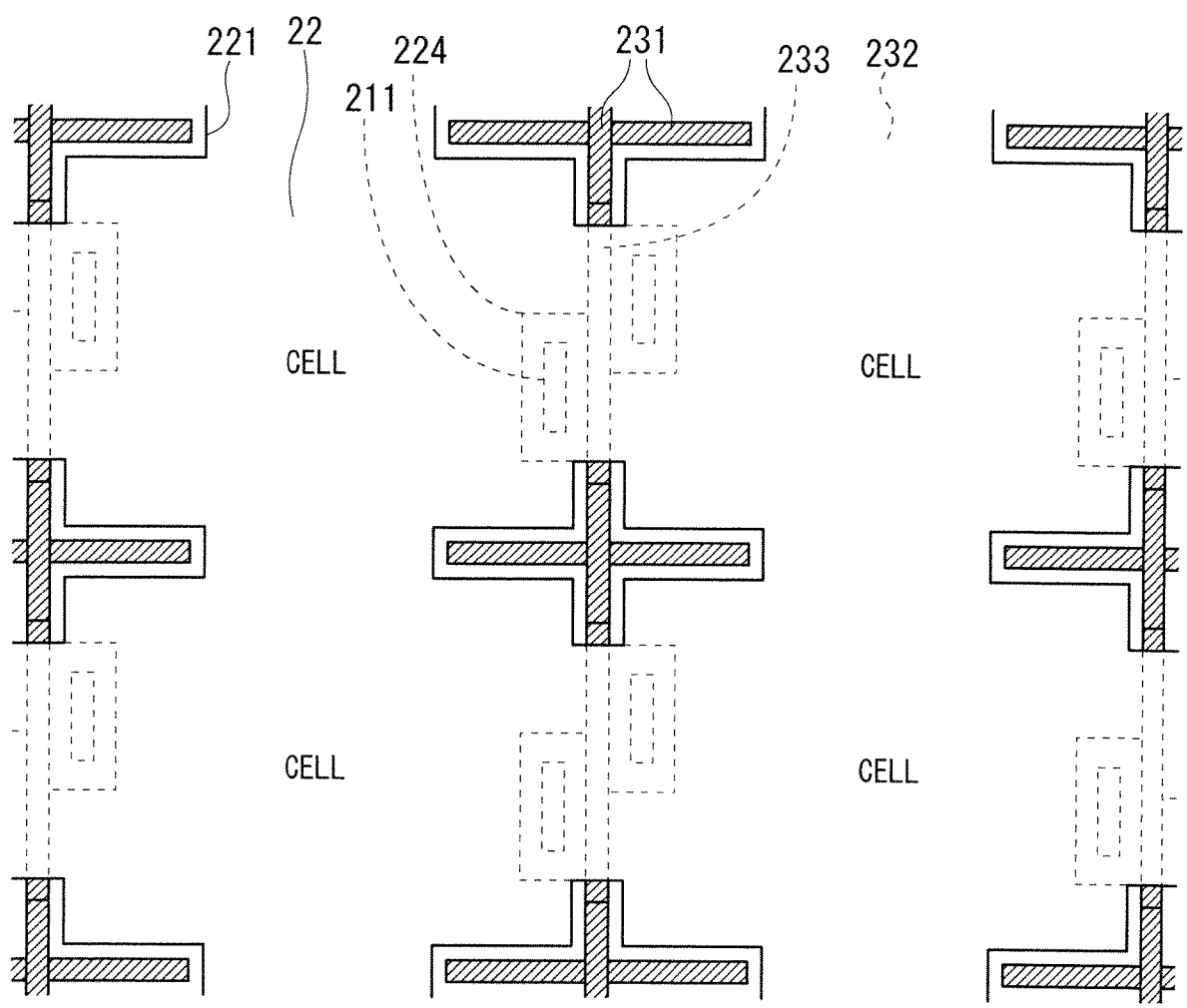
FIG. 10 is a view illustrating a modification example of arrangement of light sources.

The arrangement of the light sources 211, the configurations of the light guide plate 22 and the partition frame 23, and the like illustrated in each of the drawings above are merely an example and may be changed as appropriate. For example, two light sources 211 that are arranged in one cell are arranged so as to be opposed each other in FIG. 8, but mutual positions may be shifted as in FIG. 10 so that the two light sources 211 are not opposed to each other.

Further, as illustrated in FIG. 11, a reflective member 40 may be provided in a side surface (surface opposed to the light guide plate 22) of the partition wall 231 of the partition frame 23. With this, light emitted from a side surface of the light guide plate 22 enters the light guide plate 22 again, thereby being capable of enhancing efficiency of utilizing light. The reflective member 40 to be provided on the partition wall 231 may be formed through application of a reflective material to the partition wall 231, or may be obtained through attachment of a reflective sheet that is processed in accordance with the shape of the partition wall 231 to the partition wall 231.

Further, as in FIG. 12, the light guide plate 22 may include a reflection adjusting portion 45 in a surface opposed to the light source 211. In FIG. 12, the reflection adjusting portion 45 is provided in an inner surface of the recessed portion 224 of the light guide plate 22 in which the light source 211 is accommodated. The reflection adjusting portion 45 is provided so as to be opposed to the light source 211, thereby being capable of preventing generation of a hot spot where luminance is locally increased on the light source 211. Note that, the reflection adjusting portion 45 may be provided in the emission surface 222 of the light guide plate 22. Further, the hot spot can also be suppressed by forming, as the reflection adjusting portion 45, a prism-like pattern in an inner side of the recessed portion 224 of the light guide plate 22 and the emission surface 222 above the light source 211.

Figure 14:
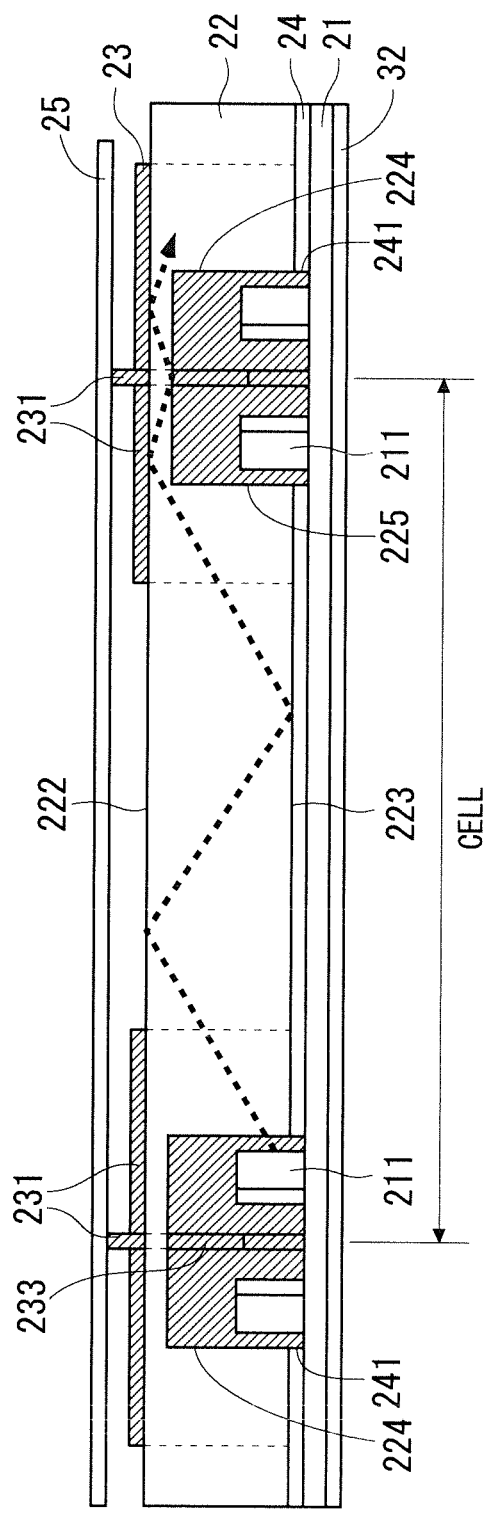
FIG. 14 is a view illustrating a modification example of a configuration of the light guide plate.

Further, adjustment of the depth of the cutout portions 232 and 233 formed in the partition wall 231 of the partition frame 23 and the thickness of the light guide plate 22 at the cell boundary portion (depth of the recessed portion 224) enables adjustment of the volume of light escaping to an adjacent cell. For example, when the thickness of the light guide plate 22 at the cell boundary portion is increased as in FIG. 13, the volume of light escaping to an adjacent cell can be increased, and when the thickness of the light guide plate 22 at the cell boundary portion is reduced as in FIG. 14, the volume of light escaping to an adjacent cell can be reduced.

<Second Preferred Embodiment>

Figure 15:
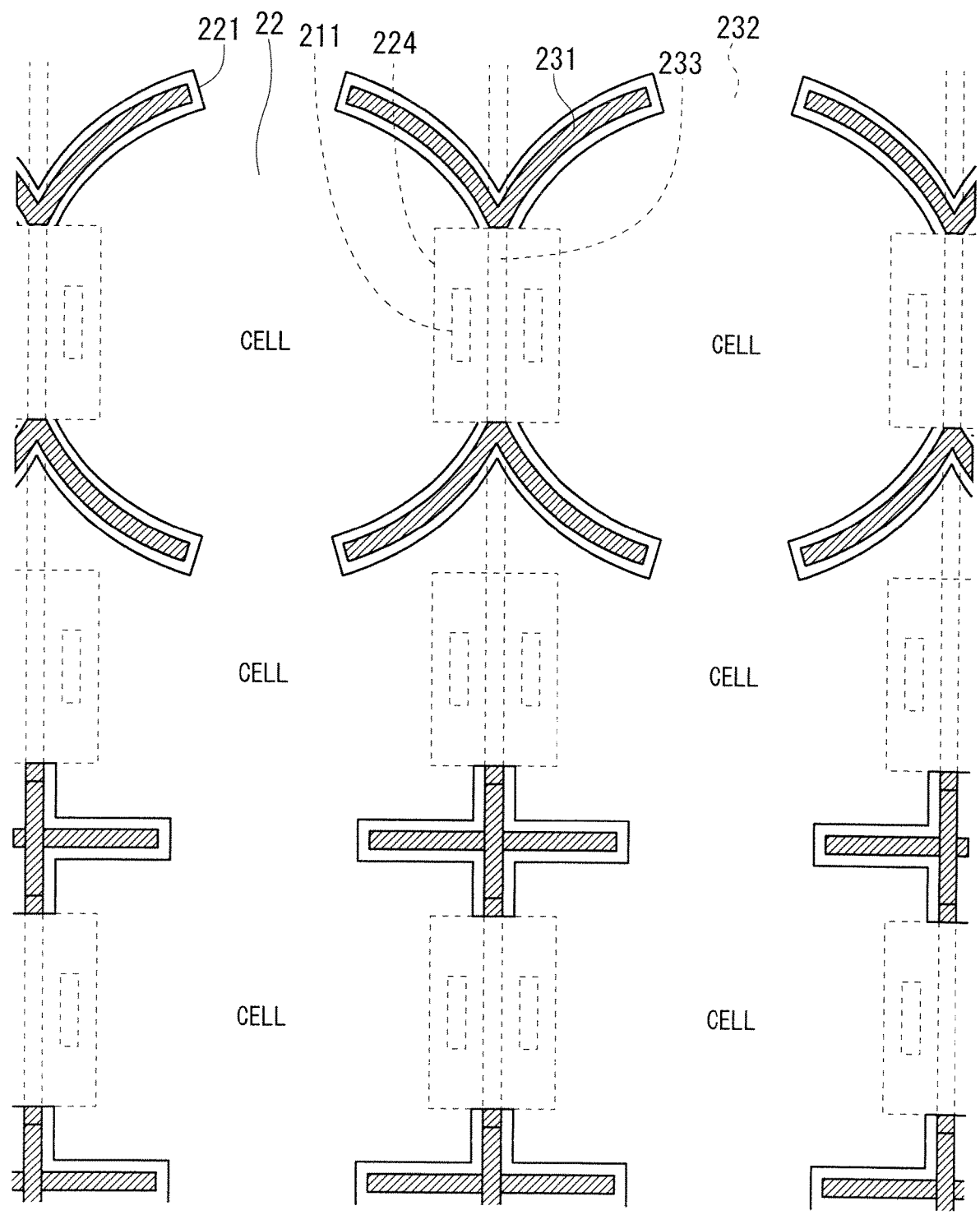
FIG. 15 is a view illustrating a configuration of a surface light source device according to a second preferred embodiment.

In the first preferred embodiment, the partition wall 231 of the partition frame 23 has a lattice shape in a plan view. In a second preferred embodiment, however, the partition wall 231 has curved portions in a plan view. FIG. 15 is an example where parts of the partition wall 231 have curved portions, and thus a circular cell is formed by the partition wall 231 having the curved portions.

For example, in a display device disposed in an instrument panel of a vehicle, display of an image in a circular gauge is assumed. The surface light source device 20 including a circular cell illustrated in FIG. 15 is effective in such a display device. Further, the shape of the cell is not to be limited to a rectangular shape and a circular shape but may be an arbitrary shape, and the shape may be designed in accordance with the shape of the display panel 10 or the shape of an image to be displayed in the display panel 10 as appropriate.

According to the second preferred embodiment, even in a case where an image display region having a shape other than a rectangular shape, such as a circular shape, is assumed, an emission region (cell) adaptable to the image display region can be provided in the surface light source device 20, and the effects similar to those of the first preferred embodiment can be attained also in that case.

<Third Preferred Embodiment>

Figure 16:
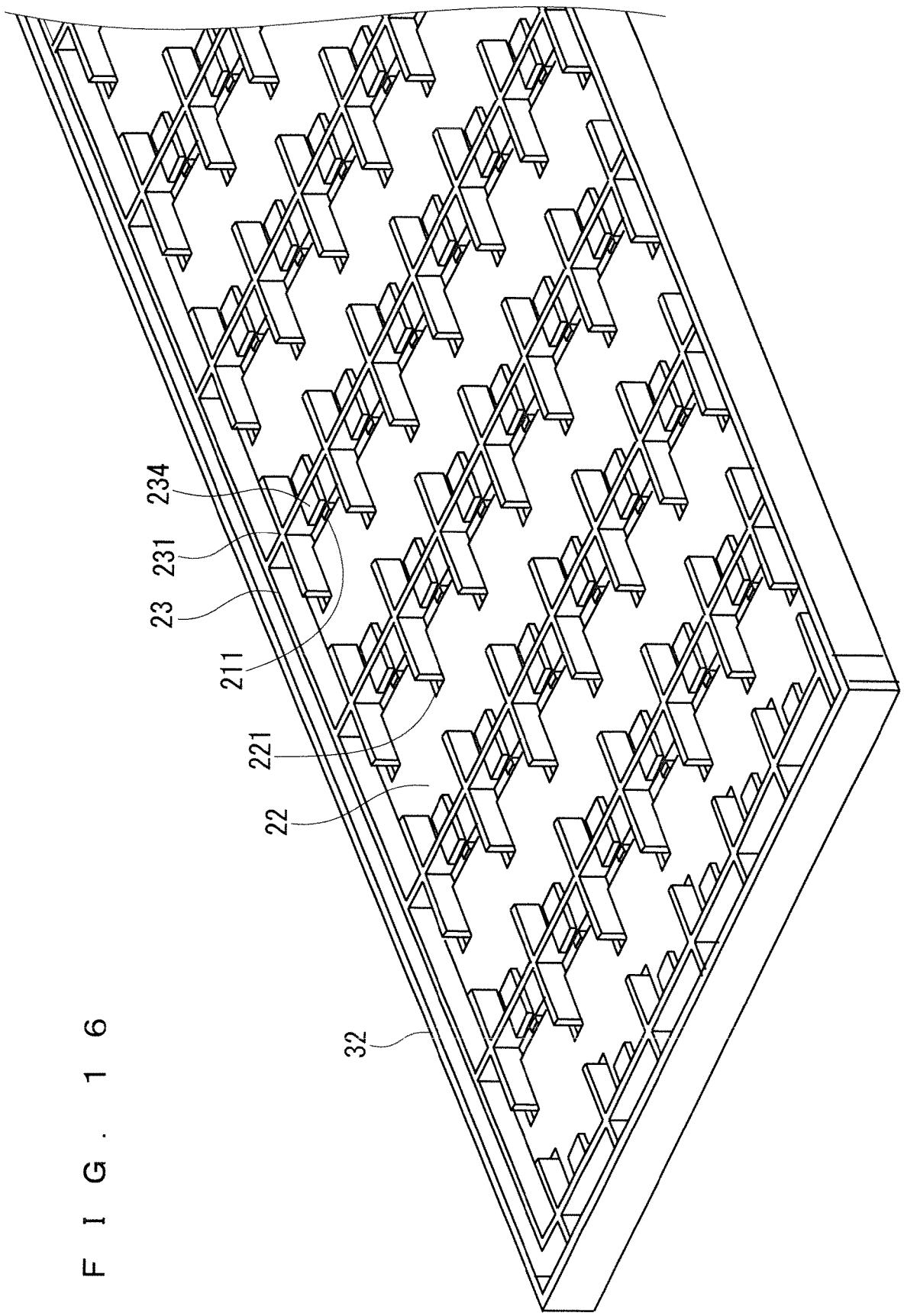
FIG. 16 is a view illustrating a configuration of a surface light source device according to a third preferred embodiment.

FIG. 16 is a view illustrating a configuration of the surface light source device 20 according to a third preferred embodiment, which illustrates, similarly to FIG. 4, a state in which the light guide plate 22, the partition frame 23, and the reflective sheet 24 are arranged on the light source substrate 21 to be accommodated in the rear frame 32. As in FIG. 16, in the third preferred embodiment, the partition frame 23 includes protrusions 234 that cover the top of the light sources 211. The protrusions 234 of the partition frame 23 block light leaking upward from the light sources 211, thereby being capable of preventing generation of a hot spot above the light sources 211.

Note that, in the example of FIG. 16, the light sources 211 are not covered by the light guide plate 22, and the recessed portions 224 for accommodating the light sources 211 are not formed in the light guide plate 22. Further, in the partition frame 23, the cutout portion is not provided on a side where the protrusion 234 of each cell is formed. Thus, in such a portion, adjacent cells are separately divided completely by the partition wall 231. However, also in this preferred embodiment, the light sources 211 may be arranged so as to be covered by the light guide plate 22. Further, also on the side where the protrusions 234 are formed, cutout portions may be provided partially (e.g., on both sides of the protrusions 234) so that the light guide plate 22 of adjacent cells are connected to each other through the cutout portions.

Note that, in the present invention, each of the preferred embodiments may be freely combined, and each of the preferred embodiments may be modified or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A surface light source device comprising:
   a light source substrate in which a plurality of light sources capable of being driven independently of one another are disposed;
   a light guide plate provided on the light source substrate to emit, from a specific emission surface, light entered from the plurality of light sources; and
   a partition frame having a partition wall to divide the light guide plate into a plurality of cells, wherein
   the partition wall of the partition frame partially has a cutout portion, the light guide plate is connected between adjacent cells through the cutout portion of the partition wall, a portion of the partition wall extends between the adjacent cells from a surface of the light guide plate opposite to the specific emission surface through the specific emission surface of the light guide plate, and a height of the partition wall of the partition frame is larger than a thickness of the light guide plate.

2. The surface light source device according to claim 1, wherein the light guide plate comprises a recessed portion in a surface on a side of the light source substrate to accommodate the plurality of light sources.

3. The surface light source device according to claim 1, wherein the light guide plate comprises a hole into which the partition wall excluding a portion where the cutout portion is formed is fitted.

4. The surface light source device according to claim 3, further comprising an optical sheet on the specific emission surface of the light guide plate, wherein the optical sheet is supported by the partition wall that projects through the hole of the light guide plate.

5. The surface light source device according to claim 4, wherein the partition wall of the partition frame comprises a curved surface in an upper end portion which comes in contact with the optical sheet.

6. The surface light source device according to claim 4, wherein the partition wall of the partition frame comprises a cushioning member provided on an upper end portion of the partition wall which comes in contact with the optical sheet.

7. The surface light source device according to claim 1, wherein the partition wall of the partition frame comprises a lattice shape in a plan view.

8. The surface light source device according to claim 1, wherein the partition wall of the partition frame comprises a curved portion in a plan view.

9. The surface light source device according to claim 1, wherein the partition wall of the partition frame comprises a protrusion that projects so as to cover a top of the plurality of light sources.

10. The surface light source device according to claim 1, wherein the light guide plate is integrally formed across the plurality of cells.

11. The surface light source device according to claim 1, wherein the partition frame comprises a reflective member in a side surface of the partition wall.

12. The surface light source device according to claim 1, wherein the light guide plate comprises a reflection adjusting portion on a surface opposed to the plurality of light sources or on the specific emission surface.

13. The surface light source device according to claim 1, further comprising, between the light source substrate and the light guide plate, a reflective sheet having holes at positions corresponding to the plurality of light sources.

14. A display device comprising:
the surface light source device of claim 1, and
a display panel arranged at a position opposed to the surface light source device.

15. A surface light source device comprising:
a light source substrate in which a plurality of light sources capable of being driven independently of one another are disposed;
a light guide plate provided on the light source substrate to emit, from a specific emission surface, light entered from the plurality of light sources; and
a partition frame of an integral configuration having a partition wall to divide the light guide plate into a plurality of cells, wherein
the partition wall of the partition frame partially has a cutout portion,
the light guide plate is connected between adjacent cells through the cutout portion of the partition wall, and
a portion of the partition wall extends between the adjacent cells from a surface of the light guide plate opposite to the specific emission surface through the specific emission surface of the light guide plate.

16. A surface light source device comprising:
a light source substrate in which a plurality of light sources capable of being driven independently of one another are disposed;
a light guide plate provided on the light source substrate to emit, from a specific emission surface, light entered from the plurality of light sources;
a partition frame having a partition wall to divide the light guide plate into a plurality of cells; and
an optical sheet on the specific emission surface of the light guide plate, wherein
the partition wall of the partition frame partially has a cutout portion,
the light guide plate is connected between adjacent cells through the cutout portion of the partition wall,
a portion of the partition wall extends between the adjacent cells from a surface of the light guide plate opposite to the specific emission surface through the specific emission surface of the light guide plate,
a height of the partition wall of the partition frame is larger than a thickness of the light guide plate, and
the optical sheet is supported by the partition wall.

* * * * *